(12) United States Patent
Katrak et al.

(10) Patent No.: US 7,089,105 B2
(45) Date of Patent: Aug. 8, 2006

(54) POWER TAKE-OFF STATE AND ENGINE SPEED REQUEST

(75) Inventors: Kerfegar K. Katrak, Fenton, MI (US); Donald A. Eveleth, Highland, MI (US); Barbara A. Shuler, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 115 days.

(21) Appl. No.: 10/874,107

(22) Filed: Jun. 22, 2004

(65) Prior Publication Data

US 2005/0283303 A1    Dec. 22, 2005

(51) Int. Cl.
*G06G 7/70* (2006.01)
*F02D 45/00* (2006.01)

(52) U.S. Cl. .................. 701/102; 701/114; 701/115

(58) Field of Classification Search ............. 701/102, 701/107, 110, 114, 115
See application file for complete search history.

(56) References Cited

U.S. PATENT DOCUMENTS

| | | | |
|---|---|---|---|
| 4,236,213 A * | 11/1980 | Richardson | 701/102 |
| 5,668,312 A * | 9/1997 | Kaman | 73/116 |
| 5,775,296 A * | 7/1998 | Goras et al. | 123/406.47 |
| 6,493,627 B1 * | 12/2002 | Gallagher et al. | 701/104 |

* cited by examiner

*Primary Examiner*—Willis R. Wolfe
*Assistant Examiner*—Johnny H. Hoang
(74) *Attorney, Agent, or Firm*—Christopher DeVries

(57) ABSTRACT

Apparatus are provided for PTO related engine control having improved failure modes and communication with PCM or ECM independent of input architecture. The apparatus includes a control module for a vehicle powertrain having an input circuit receiving signals corresponding to a four-bit code, and a processor connected to the input circuit and outputting a control signal corresponding to one of a plurality of four-bit coded engine control states. The engine control states are coded such that potential errors in communication between the control module and powertrain, and their resulting effects on powertrain operation, are minimized. For example, a single bit change during communication does not result in a transition from one engine control state to another engine control state.

20 Claims, 1 Drawing Sheet

POWER TAKE-OFF STATE AND ENGINE SPEED REQUEST

TECHNICAL FIELD

The present invention generally relates to motor vehicle powertrain control, and more particularly relates to a control module communicating with a motor vehicle powertrain having coded engine control states.

BACKGROUND

Power take-off (PTO) may be a common function used in vehicle powertrain management. PTO may provide power to up-fitter installed accessories such as a bucket lift, also referred to as a "cherry picker", a snow plow, a dump body, etc. PTO is a mechanism or technique, such as using a gearbox or bolt-on attachment, of driving a pump to supply power necessary to provide a function, such as lifting or manipulating the dump body, bucket lift, or snow plow. PTO may be enabled through conventional switching of a single polarity change, such as between an unasserted low, or inactive state, and an asserted high, or active state. Common switching arrangements for PTO enable function, Tap-up function, and Tap-down function include the use of 0 Volts for the unasserted low state and a battery voltage for the asserted high state for each of those functions.

A concern with control of engine operation is with failure modes of communication between various engine components. Compliance with probability of occurrence metrics is generally required to meet safety and performance requirements of various motor vehicle components. A rolling count or other similar failure checking mechanism is currently used to monitor PTO states, but these mechanisms generally require complex software operations. Additionally, failure modes of various conventional PTO states are generally undesirable operating states. For example, the single function switch for cruise enable and PTO enable, previously mentioned hereinabove, defaults to one of the unasserted low state or asserted high state to produce an undesirable condition.

Accordingly, it is desirable to provide an engine management system for motor vehicle powertrain applications that has improved failure modes. In addition, it is desirable to provide a control module that communicates with the vehicle powertrain that is simple to implement, accepts multiple input options, and accounts for a variety of communication errors. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, an apparatus is provided for PTO related engine control having improved failure modes and communication with PCM or ECM independent of input architecture. In one exemplary embodiment, the apparatus is a control module for a vehicle powertrain having an input circuit receiving signals corresponding to a 4-bit code, and a processor connected to the input circuit and outputting a control signal corresponding to one of a plurality of 4-bit coded engine control states. The engine control states are coded such that potential errors in communication between the control module and powertrain, and their resulting effects on powertrain operation, are minimized. For example, a single bit change during communication does not result in a transition from one engine control state to another engine control state.

In another exemplary embodiment, the apparatus is a communication device for motor vehicle powertrain control having: a switching circuit with at least three outputs for transmitting switch signals corresponding to an engine request; and, a detector circuit having an input receiving switch signals from the switching circuit. In this embodiment, the detector circuit transmits an output signal upon determination of a four-bit coded function state corresponding to the received switch signals. The function states are selected from a No Action state, a PTO Off state, a PTO On state, a Reserved state, a Speed Up state, a Speed Down state, one of a Speed Up Fast state and a Failed Action state, and one of a Speed Down Fast state and an Indeterminate state.

In yet another exemplary embodiment, an electronic engine management system is provided having an engine control module (ECM) varying engine function in a motor vehicle, and a PTO module connected to the ECM and transmitting control signals to the ECM. In this embodiment, the PTO module includes an input circuit receiving engine request signals, and a processor connected to the input circuit and selecting a control signal from a plurality of four-bit coded engine control states based on the received engine request signals.

BRIEF DESCRIPTION OF THE DRAWINGS

The present invention will hereinafter be described in conjunction with the following drawing figures, wherein like numerals denote like elements.

DETAILED DESCRIPTION

Figure 1:
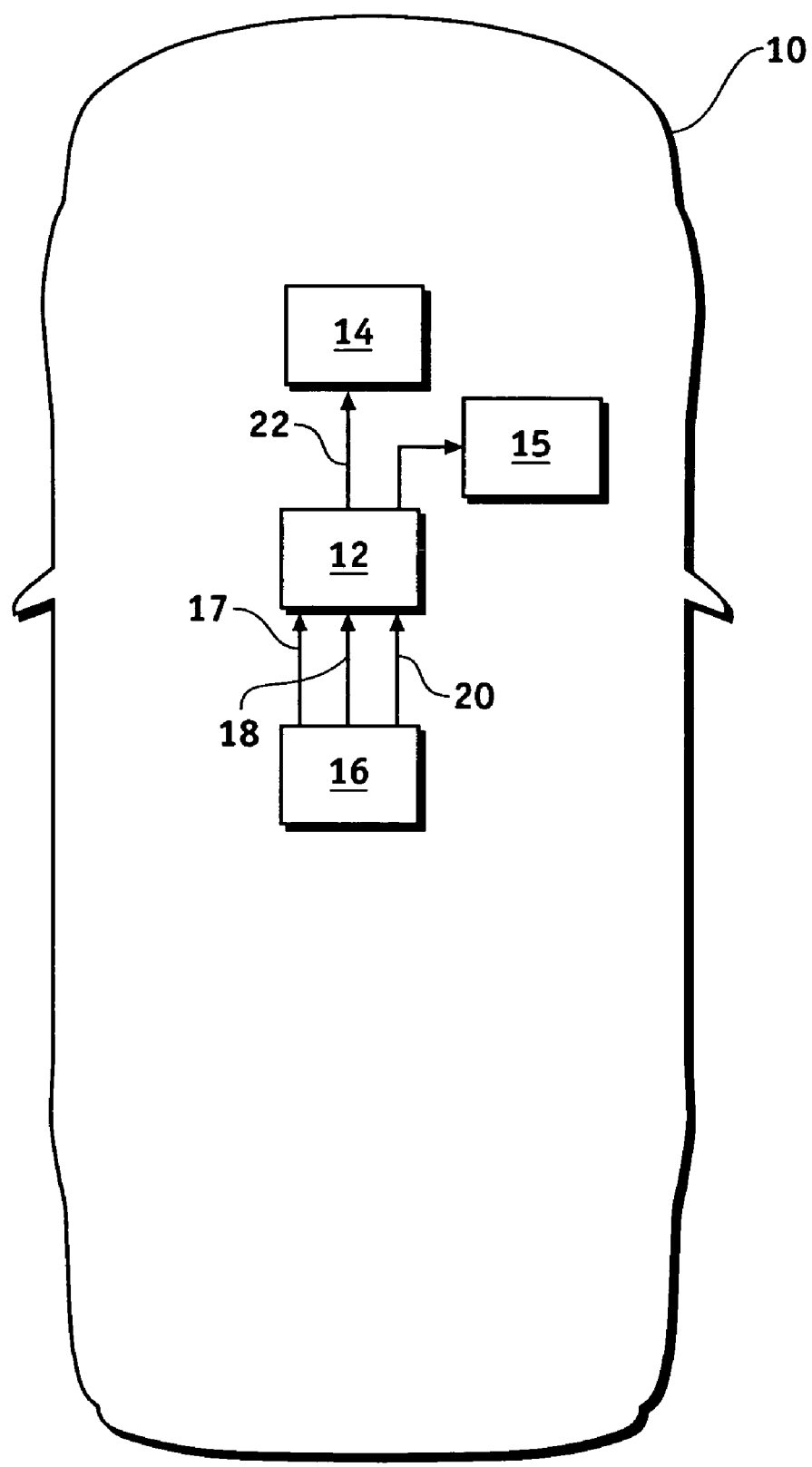
FIG. 1 is a block diagram of an exemplary vehicle.

The following detailed description of the invention is merely exemplary in nature and is not intended to limit the invention or the application and uses of the invention. Furthermore, there is no intention to be bound by any theory presented in the preceding background of the invention or the following detailed description of the drawings.

According to various embodiments, a control module is provided that communicates engine or vehicle powertrain requests to conventional powertrain control modules (PCM) or engine control modules (ECM). The requests may be correspond to any variety of engine control states including, but not limited to, power take-off (PTO) enable or PTO On, PTO disable or PTO Off, vehicle speed set 1, speed-up engine speed, vehicle speed set 2, speed-down engine speed, speed-up engine speed fast, speed-down engine speed fast, no action, failed action, indeterminate. A number of different input architectures may be used with the control module such as five (5) position PTO internal cab switches, seven (7) position PTO internal cab switches, and multiple three-state PTO switches. Other single position or multiple position switch inputs may be connected with the control module depending on desired engine control operations. Using four-bit coded engine control states, the control module may transmit engine control states to the PCM with improved failure modes, described in greater detail hereinbelow.

Although the present invention is described in the context of engine control states and related communication between the PTO control module and PCM, other engine requests or vehicle operation requests or states may be similarly communicated between a control module and an appropriate vehicle component. For example, a control module may be connected with an electronic door lock having multiple function positions, such as door lock, power on, ignition on, windows up, and door unlock. In this example, the control module may be connected to multiple vehicle components and transmit operation states or requests to each component based on a desired function request.

Referring to the drawings, FIG. 1 is a block diagram of an exemplary vehicle, shown generally at 10, having a PTO control module 12 communicating engine control states to a PCM 14. A switch input 16 is connected to the control module 12 to convey input signals corresponding to user-desired or user-initiated engine operation requests. The switch input 16 may take a variety of different structures as previously mentioned, and the control module 12 is well-suited to operate with switches having multiple inputs to the control module 12. The control module 12 may optionally be connected to multiple vehicle components 14, 15 depending on the desired vehicle operation requests. It should be appreciated that the blocks of FIG. 1 (as well as the blocks in the other block diagrams disclosed herein) can represent functional elements and discrete hardware elements. For example, in one embodiment of the invention, some of the functions or hardware elements illustrated in FIG. 1 may be implemented in a single processor unit. Alternatively, a portion of the functions may be implemented in a single processor unit in combination with hardware elements. The functions can be implemented in hardware, all in software, or a combination of hardware and software can be used.

The PTO control module 12 receives input signals 17, 18, 20 from the PTO function switch 16 and transmits a control signal 32 to the PCM 14 based on the received signals 17, 18, 20. The received input signals 17, 18, 20 correspond to four-bit coded engine control states where each desired engine control state is assigned a unique four-bit code. Any remaining four-bit codes that have not been assigned to a desired engine control state are each set as a failure state. In one embodiment, the PTO control module 12 is a microprocessor-based controller having discrete inputs associated with the PTO function switch and memory storing a look-up table of engine control states corresponding to each four-bit code. In this embodiment, depending on the received input signals 17, 18, 20, the PTO control module 12 determines a corresponding engine control state from the look-up table in memory and transmits such engine control state to the PCM 14. The PTO control module 12 may communicate with the PCM 14 using a conventional high speed serial interlink, such as controller area network (CAN). In automotive applications where one-byte serial communication is commonly used, the four-bit coded states are compatible and also have an advantage of simplicity while providing a robust system.

The switch 16 is an electronic switch or switching circuit for a vehicle powertrain function, such as PTO, and may be based on multiple two-state or multi-state inputs to the control module 12. For example, the switch may have a first input connected to one of two different reference voltages and a second input connected to one of the two reference voltages. One of the reference voltages may be a high reference voltage, such as a battery voltage (e.g., $B^+$ or $V_{ref}$), and the other reference voltage may be a low reference voltage, such as ground or 0 Volts. Those skilled in the art will appreciate that voltage divider circuits and analog-to-digital converters may optionally be included depending on input requirements of the control module 12.

The switch 16 is any device capable of providing various output signals 17, 18, 20 such as logic high and logic low signals, to the control module 12 in response to user commands, sensor readings or other input stimuli. In an exemplary embodiment, the switch 12 responds to user selections made by displacing or activating a lever (not shown) or other actuator on the switch as appropriate. In another embodiment, the switch 16 responds to non-actuated input, such as a sensor reading. Various switches may be formulated with electrical, electronic, and/or mechanical actuators to produce appropriate output signals onto a wire or other electrical conductor joining the switch 16 and the control module 12. These logic signals may be processed by the control module 12 to place the component into desired states as appropriate.

Based on a pre-determined forward position look-up table of function states corresponding to the switch input signals 17, 18, 20, the control module 12 determines and transmits an appropriate control signal 22 to the PCM 14. The switch input signals 17, 18, 20 are translated by the control module 12 into four-bit coded function states. The assignment of different four-bit codes to a particular function state is such that a single bit change does not result in a transition from one function state to another function state. This single bit failure mode generally provides for more robust communication of function states or engine control states. Additional function state coding, described hereinbelow, further assists in providing robust communication.

Table 1 shows a variety of engine control states or function states corresponding to various combinations of signals received by the PTO control module 12 in one embodiment. In this embodiment, the PTO function states are 4-bit coded states and include a No Action state, a PTO Off state, a PTO On state, a Reserved state, a Speed Up state, a Set 1 speed or a Speed Up state, a Set 2 speed of a Speed Down state, a Speed Up Fast state or a Failed Action state, and a Speed Down Fast state or an Indeterminate state. The remaining four-bit codes that have not been assigned a function state are each a Failure state. The PTO Off state disables PTO. The PTO On state enables PTO. The Reserved state is not designated a particular function nor is it a Failure state. In one embodiment, the Speed Up state requests powertrain operation corresponding to increase vehicle engine speed, and the Speed Down state requests powertrain operation corresponding to decrease vehicle engine speed. In another embodiment, the Set 1 state requests powertrain operation corresponding to establishing a first speed of the vehicle, and the Set 2 state requests powertrain operation corresponding to establishing a second speed of the vehicle. In one embodiment, the Speed Up Fast state requests powertrain operation corresponding to a larger step or higher rate of increased vehicle engine speed, and the Speed Down Fast state requests powertrain operation corresponding to a larger step or higher rate of decrease vehicle engine speed. In another embodiment, the Failed Action state indicates a problem with at least one input and the PCM does not act on the request. In another embodiment, the Indeterminate state is a pre-transmission state, such as for contact bounce or prior to hardware (e.g., microprocessor) initialization.

The Speed Up state is a 4-bit complement of the No Action state, and the Speed Down state is a 4-bit complement of the Reserved state. The Speed Up Fast state or Failed Action state is a 4-bit complement of the PTO Off state, and the Speed Down Fast state or Indeterminate state is a 4-bit complement of the PTO On state. The PTO Off state and PTO On state are coded such that the respective complement does not result in a transition between these states. Each of these coding constraints provides communication failure modes that are generally desirable from an engine management standpoint.

TABLE 1

| Bit 4 | Bit 3 | Bit 2 | Bit 1 | Decimal Value | Function State |
|---|---|---|---|---|---|
| 0 | 1 | 1 | 0 | 6 | No Action |
| 0 | 0 | 0 | 0 | 0 | PTO OFF |
| 0 | 0 | 1 | 1 | 3 | PTO ON |
| 0 | 1 | 0 | 1 | 5 | Reserved |
| 1 | 0 | 0 | 1 | 9 | Set 1 or Speed Up |
| 1 | 0 | 1 | 0 | 10 | Set 2 or Speed Down |
| 1 | 1 | 0 | 0 | 12 | Speed Up Fast or Failed Action |
| 1 | 1 | 1 | 1 | 15 | Speed Down Fast or Indeterminate |

Table 2 shows a variety of engine control states or function states corresponding to various combinations of signals received by the PTO control module 12 in another embodiment. The PTO function states are also 4-bit coded states and include a No Action state, a PTO Off state, a PTO On state, a Reserved state, a Speed Up state, a Set 1 speed or a Speed Up state, a Set 2 speed of a Speed Down state, a Speed Up Fast state or a Failed Action state, and a Speed Down Fast state or an Indeterminate state. The Speed Up state has a 4-bit complement of the No Action state, and the Speed Down state has a 4-bit complement of the Reserved state. In this embodiment, the Speed Up Fast state has a 4-bit complement of the PTO On state, and the Speed Down Fast state has a 4-bit complement of the PTO Off state. The remaining four-bit codes that have not been assigned a function state are each a Failure state. These coding constraints also provide communication failure modes that are generally desirable from an engine management standpoint. In both Tables 1 and 2, a transition from one function state to another function state requires a two-bit error.

TABLE 2

| Bit 4 | Bit 3 | Bit 2 | Bit 1 | Decimal Value | Function State |
|---|---|---|---|---|---|
| 0 | 0 | 0 | 1 | 1 | No Action |
| 0 | 0 | 1 | 0 | 2 | PTO OFF |
| 0 | 1 | 0 | 0 | 4 | PTO ON |
| 1 | 0 | 0 | 0 | 8 | Reserved |
| 1 | 1 | 1 | 0 | 14 | Set 1 or Speed Up |
| 0 | 1 | 1 | 1 | 11 | Set 2 or Speed Down |
| 1 | 1 | 0 | 1 | 13 | Speed Up Fast or Failed Action |
| 1 | 0 | 1 | 1 | 7 | Speed Down Fast or Indeterminate |

Table 3 shows an exemplary embodiment of the four-bit coding shown in Table 1 with an internal cab switch, stationary or mobile, providing three-state inputs to the PTO control module.

TABLE 3

| Input 1 | Input 2 | Input 3 | Decimal Value | Function State |
|---|---|---|---|---|
| V | V | V | 6 | No Action |
| 0 | V | 1 | 0 | PTO OFF |
| 1 | V | 0 | 3 | PTO ON |
| Spare | Spare | Spare | 5 | Reserved |
| V | 0 | 1 | 9 | Set 1 or Speed Up |
| V | 1 | 0 | 10 | Set 2 or Speed Down |
| 0 | 1 | V | 12 | Speed Up Fast or Failed Action |
| 1 | 0 | V | 15 | Speed Down Fast or Indeterminate |

Table 4 shows an exemplary embodiment of the four-bit coding shown in Table 1 with a stationary external cab switch providing three-state inputs to the PTO control module.

TABLE 4

| Input 1 | Input 2 | Input 3 | Input 4 | Decimal Value | Function State |
|---|---|---|---|---|---|
| 0/V | 1 | N/A | N/A | 0 | PTO OFF |
| 1 | 0/V | N/A | N/A | 3 | PTO ON |
| Spare | Spare | Spare | Spare | 5 | Reserved |
| N/A | N/A | V | V | 6 | No Action |
| N/A | N/A | 0 | 1 | 9 | Set 1 or Speed Up |
| N/A | N/A | 1 | 0 | 10 | Set 2 or Speed Down |
| N/A | N/A | N/A | N/A | 12 | Speed Up Fast or Failed Action |
| N/A | N/A | N/A | N/A | 15 | Speed Down Fast or Indeterminate |

Table 5 shows an exemplary embodiment of the four-bit coding shown in Table 2 with an internal cab switch, stationary or mobile, providing three-state inputs to the PTO control module.

TABLE 5

| Input 1 | Input 2 | Input 3 | Decimal Value | Function State |
|---|---|---|---|---|
| V | V | V | 1 | No Action |
| 0 | V | 1 | 2 | PTO OFF |
| 1 | V | 0 | 4 | PTO ON |
| Spare | Spare | Spare | 8 | Reserved |
| V | 0 | 1 | 14 | Set 1 or Speed Up |
| V | 1 | 0 | 11 | Set 2 or Speed Down |
| 0 | 1 | V | 13 | Speed Up Fast or Failed Action |
| 1 | 0 | V | 7 | Speed Down Fast or Indeterminate |

Table 6 shows an exemplary embodiment of the four-bit coding shown in Table 2 with a stationary external cab switch providing three-state inputs to the PTO control module.

TABLE 6

| Input 1 | Input 2 | Input 3 | Input 4 | Decimal Value | Function State |
|---|---|---|---|---|---|
| 0/V | 1 | N/A | N/A | 2 | PTO OFF |
| 1 | 0/V | N/A | N/A | 4 | PTO ON |
| Spare | Spare | Spare | Spare | 8 | Reserved |
| N/A | N/A | V | V | 1 | No Action |
| N/A | N/A | 0 | 1 | 14 | Set 1 or Speed Up |
| N/A | N/A | 1 | 0 | 11 | Set 2 or Speed Down |
| N/A | N/A | N/A | N/A | 13 | Speed Up Fast or Failed Action |
| N/A | N/A | N/A | N/A | 7 | Speed Down Fast or Indeterminate |

In Tables 3–6, "1" is a high value, "0" is a low value, and "V" is an intermediate value used with the three-state inputs for the respective switches. "O/V" indicates either a low value or an intermediate value can be used for the input signal. "N/A" indicates an input signal from the corresponding input is not available. "Spare" indicates a non-assigned input that is also a non-failure designation. As shown from Tables 3–6 where different four-bit coding for switches having 3 and 4 three-state inputs, multiple input options of PTO architecture are available for use with the control module. However, other input combinations may be used with the four-bit coding embodiments shown in Tables 1 and 2.

Between the four-bit coding embodiments shown in Tables 1 and 2, the four-bit coding embodiment of Table 2 is preferred because default states (e.g., 0000 and 1111) are not assigned to function states. With either four-bit coding embodiment, rolling count or other failure checking mechanism is generally no required for the PTO function states. This reduces software complexity that may be used in the PTO control module and PCM.

The PTO control module 12 may also redundantly calculate engine speed requests. For example, the PTO control module 12 may poll the PCM for information on the actual speed upon receipt of a switch input corresponding to a Set 1, or Speed Up, request or a Set 2, or Speed Down, request. A serial bus (not shown) may be connected between the PTO control module 12 and the PCM 14 for actual speed polling. The actual speed information is compared by the PTO control module with the engine speed request, based on the switch input, to determine the status of the powertrain with respect to the engine speed request. In one embodiment, if the powertrain is currently operating according to the request, the PTO control module does not transmit the respective engine speed request. This assists in meeting safety requirements for communication between the PTO control module and the PCM.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control module for a vehicle powertrain, said control module comprising:
    an input circuit receiving signals corresponding to a 4-bit code; and
    a processor connected to said input circuit and outputting a control signal corresponding to one of a plurality of 4-bit coded engine control states, said plurality of 4-bit coded engine control states configured such that a change in a single bit of one of said plurality of 4-bit coded engine control states does not result in another of said plurality of 4-bit coded engine control states.

2. A control module according to claim 1, wherein said plurality of 4-bit coded engine control states comprises:
    a No Action state;
    a PTO Off state;
    a PTO On state;
    a Reserved state;
    a Speed Up state having a 4-bit complement of said No Action state; and
    a Speed Down state having a 4-bit complement of said Reserved state.

3. A control module according to claim 2, wherein said plurality of states further comprises:
    one of a Speed Up Fast state and a Failed Action state each having a 4-bit complement of said PTO Off state; and
    one of a Speed Down Fast state and an Indeterminate state each having a 4-bit complement of said PTO On state.

4. A control module according to claim 2, wherein said plurality of states further comprises:
    one of a Speed Up Fast state and a Failed Action state each having a 4-bit complement of said PTO On state; and
    one of a Speed Down Fast state and an Indeterminate state each having a 4-bit complement of said PTO Off state.

5. A control module according to claim 1 further comprising a serial bus input connected to said processor and receiving data corresponding to at least one of a vehicle speed and an engine revolutions per minute (RPM); wherein said processor periodically calculates engine speed based on at least one of the vehicle speed and the engine RPM and compares the calculated engine speed to the signal received by said input circuit.

6. A control module according to claim 3 further comprising a memory having a look-up table of said plurality of states; wherein said processor is configured to determine a Failure state when the signals from said input circuit do not correspond to any of said plurality of states.

7. A control module according to claim 4 further comprising a memory having a look-up table of said plurality of states; wherein said processor is configured to determine a Failure state when the signals from said input circuit do not correspond to any of said plurality of states.

8. An electronic engine management system comprising:
    an engine control module (ECM) varying engine function in a motor vehicle;
    a PTO module connected to said ECM and transmitting control signals to said ECM, said PTO module comprising:
        an input circuit receiving engine request signals; and
        a processor connected to said input circuit and selecting a control signal from a plurality of 4-bit coded engine control states based on the received engine request signals, said plurality of 4-bit coded engine control states configured such that a change in a single bit of one of said plurality of 4-bit coded engine control states does not result in another of said plurality of 4-bit coded engine control states.

9. An engine management system according to claim 8, wherein said plurality of 4-bit coded engine control states comprises:
   a No Action state;
   a PTO Off state;
   a PTO On state;
   a Reserved state;
   a Speed Up state having a two's complement of said No Action state; and
   a Speed Down state having a two's complement of said Reserved state.

10. An engine management system according to claim 9, wherein said plurality of states further comprises:
    one of a Speed Up Fast state and a Failed Action state each having a 4-bit complement of said PTO Off state; and
    one of a Speed Down Fast state and an Indeterminate state each having a 4-bit complement of said PTO On state.

11. An engine management system according to claim 10, wherein said No action state is 0001, said PTO Off state is 0010, said PTO On is 0100, said Reserved state is 1000, said Speed Up state is 1110, said Speed Down state is 0111, said Speed Up Fast state is 1101, and said Speed Down Fast state is 1011.

12. An engine management system according to claim 9, wherein said plurality of states further comprises:
    one of a Speed Up Fast state and a Failed Action state having a 4-bit complement of said PTO On state; and
    one of a Speed Down Fast state and an Indeterminate state having a 4-bit complement of said PTO Off state.

13. An engine management system according to claim 12, wherein said No action state is 0110, said PTO Off state is 0000, said PTO On is 0011, said Reserved state is 0101, said Speed Up state is 1001, said Speed Down state is 1010, said Speed Up Fast state is 1100, and said Speed Down Fast state is 1111.

14. An engine management system according to claim 11, wherein said PTO module further comprises a memory having a look-up table of said plurality of states; wherein said processor is configured to determine the Failure state when the received engine request signals does not correspond to one of said plurality of states.

15. An engine management system according to claim 13, wherein said PTO module further comprises a memory having a look-up table of said plurality of states; wherein said processor is configured to determine the Failure state when the received engine request signals does not correspond to one of said plurality of states.

16. A communication device for motor vehicle powertrain control, said communication device comprising:
    a switching circuit having at least three outputs for transmitting switch signals corresponding to an engine request;
    a detector circuit having an input receiving switch signals from said switching circuit, said detector circuit transmitting an output signal upon determination of a 4-bit coded function state corresponding to the received switch signals; and
    a memory coupled with said detector circuit and storing a plurality of 4-bit coded function states, the plurality of 4-bit coded function states comprising: a No Action state; a PTO Off state; a PTO On state; a Reserved state; a Speed Up state; a Speed Down state; one of a Speed Up fast state and a Failed Action state; and one of a Speed Down Fast state and an Indeterminate state.

17. A communication device according to claim 16, wherein non-function designated 4-bit codes are each a Failure state.

18. A communication device according to claim 17, wherein the plurality of functions states are configured such that a change in a single bit of one of the plurality of function states does not result in a transition from one non-Failure state to another non-Failure state.

19. A communication device according to claim 16, wherein said No Action state is a 0001 code, said PTO Off state is a 0010 code, said PTO On is a 0100 code, said Reserved state is a 1000 code, said Speed Up state is a 1110 code, said Speed Down state is a 0111 code, said Speed Up Fast state and said Failed Action state are both a 1101 code, and said Speed Down Fast state and said Indeterminate state are both a 1011 code.

20. A communication device according to claim 16, wherein said No Action state is a 0110 code, said PTO Off state is a 0000 code, said PTO On is a 0011 code, said Reserved state is a 0101 code, said Speed Up state is a 1001 code, said Speed Down state is a 1010 code, said Speed Up Fast state and said Failed Action state are both a 1100 code, and said Speed Down Fast state and said Indeterminate state are both a 1111 code.

* * * * *